(12) United States Patent
Tanimura et al.

(10) Patent No.: US 8,920,763 B2
(45) Date of Patent: Dec. 30, 2014

(54) METHOD FOR PRODUCING LITHIUM CARBONATE

(75) Inventors: Yuji Tanimura, Tokyo (JP); Kohei Mitsuhashi, Tokyo (JP); Ryo Kawarabuki, Tokyo (JP); Masanobu Kawata, Tokyo (JP); Yutaka Yamaguchi, Tokyo (JP)

(73) Assignees: Nittetsu Mining Co., Ltd., Tokyo (JP); Sumitomo Corporation, Tokyo (JP)

( * ) Notice: Subject to any disclaimer, the term of this patent is extended or adjusted under 35 U.S.C. 154(b) by 42 days.

(21) Appl. No.: 13/482,254

(22) Filed: May 29, 2012

(65) Prior Publication Data
US 2012/0237419 A1    Sep. 20, 2012

(30) Foreign Application Priority Data

Nov. 30, 2010   (JP) ................................ 2010-266077

(51) Int. Cl.
*C01D 15/08*   (2006.01)
*C01D 15/04*   (2006.01)

(52) U.S. Cl.
CPC .............. *C01D 15/08* (2013.01); *C01D 15/04* (2013.01)
USPC .................. 423/421; 423/419.1; 429/231.95; 429/323

(58) Field of Classification Search
USPC ............. 423/419.1, 421; 429/231.95, 322, 32
See application file for complete search history.

(56) References Cited

U.S. PATENT DOCUMENTS

| | | | |
|---|---|---|---|
| 1,923,084 A * | 8/1933 | Gillette | 423/438 |
| 4,018,876 A * | 4/1977 | Jordan | 423/421 |
| 6,143,260 A | 11/2000 | Boryta | |
| 6,207,126 B1 | 3/2001 | Boryta et al. | |
| 6,555,075 B2 * | 4/2003 | Nip | 423/105 |
| 6,592,832 B1 | 7/2003 | Friedrich et al. | |
| 2006/0115407 A1 * | 6/2006 | Boryta et al. | 423/421 |
| 2011/0200508 A1 * | 8/2011 | Harrison et al. | 423/276 |

FOREIGN PATENT DOCUMENTS

| | | |
|---|---|---|
| CL | 2938-98 | 9/1999 |
| CL | 1606-99 | 3/2000 |
| CL | 1607-99 | 3/2000 |
| CL | 98-02 | 3/2007 |
| JP | 55-144410 A | 11/1980 |
| JP | 58-172229 A | 10/1983 |
| JP | 59-039719 A | 3/1984 |
| JP | 62-036013 A | 2/1987 |
| JP | 62-252315 A | 11/1987 |
| JP | 2002-505248 A | 2/2002 |

OTHER PUBLICATIONS

Ailsa Allaby and Michael Allaby. "geothermal brine." A Dictionary of Earth Sciences. 1999. Encyclopedia.com. Jul. 22, 2013 <http://www.encyclopedia.com>.*
Fuchiwaki et al., "Development of technology for the collection of lithium from brine water from salt lakes in South America", Magazine of the Society of Sea Water Science, vol. 66, No. 1, pp. 8-11 (Feb. 1, 2012). JAPAN.
Notification of Reasons for Refusal issued Aug. 6, 2013, by the Japan Patent Office in corresponding Japanese Application No. 2010-266077.
"Lithium Resources," GSJ Chishitsu News, No. 670, Jun. 2010, pp. 22-26.
"Production of Lithium from Salar de Atakama, Chile, and Use of Lithium Compounds," GSJ Chishitsu News No. 670, Jun. 2010, pp. 49-52.
Communication dated Aug. 11, 2014, issued by the Chilean Patent Office in application No. 1370-12.

* cited by examiner

*Primary Examiner* — Richard M Rump
(74) *Attorney, Agent, or Firm* — Sughrue Mion, PLLC

(57) ABSTRACT

The present invention relates to a method for producing lithium carbonate, the method including: mixing ammonia and carbon dioxide gas (carbonate gas) with an aqueous solution containing lithium chloride to conduct a carbonation reaction; and thereafter, recovering a produced solid by solid-liquid separation, and also relates to a method for producing high purity lithium carbonate.

4 Claims, No Drawings

METHOD FOR PRODUCING LITHIUM CARBONATE

FIELD OF THE INVENTION

The present invention relates to a method for producing lithium carbonate particularly useful as a raw material of electronic materials and optical industrial materials, and relates to a method for producing high purity lithium carbonate.

More particularly, the invention relates to a method for producing lithium carbonate, which is particularly suitable for producing high purity lithium carbonate having such a purity that it can be used as a lithium battery material from a brine containing lithium chloride, and relates to a method for producing high purity lithium carbonate, including purifying and recovering the lithium carbonate.

BACKGROUND OF THE INVENTION

Lithium carbonate has been used for various applications such as a compounding agent of heat-resistant glass, optical glass and the like, a ceramic material, a raw material of lithium secondary batteries used as batteries of cellular phones and notebook computers, a material of electrolytes, and a raw material of lithium niobate single crystals and lithium tantalate single crystals used in semiconductor lasers and the like.

Characteristics required for the lithium carbonate are variable and vary according to its application. For example, when lithium carbonate is used as the above-mentioned electronic materials or optical industrial materials, a large amount of impurities deteriorate electric properties or optical properties thereof. It is therefore required to contain less impurities and have a high purity. Further, as the raw material of lithium secondary batteries, there has been demanded lithium carbonate having a purity of 97% or more, preferably 98% or more, more preferably 99% or more and still more preferably 99.5% or more. In addition, high purity lithium carbonate in which the content of dissimilar metals and the other impurities is at a level of several ppm and further 1 ppm or less is demanded in some cases.

The lithium carbonate is produced from naturally-occurring lithium resources, and as the resources in which such lithium occurs in high concentrations and in large amounts, there are lithium deposits and brines in intercontinental salt lakes. In the present situation, however, the production of lithium carbonate using the brines in intercontinental salt lakes constitutes a large proportion thereof (see Non-Patent Documents 1 and 2).

Further, for the production from the brines, with advance of development of electric vehicles, lithium batteries have been in the limelight as driving force sources, and attention has been attracted to the brines as the lithium resources again, as supply sources for large consumption thereof (see Non-Patent Documents 1 and 2).

The salt lakes in which the brines are obtained are in limited areas such as China, U.S.A., Chile, Argentine and Bolivia, and unevenly distributed.

In particular, salt lakes in the Andean area such as Salar de Atacama (Chile), Salar de Hombre Muerto (Argentine) and Salar de Uyuni (Bolivia) are excel at their lithium reserves (see Non-Patent Document 1). Actually, a large amount of lithium carbonate is produced using the brines in this area as raw materials of lithium (see Non-Patent Document 2).

The concentration of lithium (Li) in the brines of these salt lakes in the Andes is about 0.05 to 0.3%. After concentrated to about 6% in the sun, this is utilized for the above-mentioned production of lithium carbonate and the like. In that case, this is utilized for the production of lithium carbonate and the like, in a form of lithium chloride.

In these brines, there are contained sodium, potassium, magnesium and the like in high concentrations, in addition to lithium, and in order to produce high purity lithium carbonate, it is necessary to separate and remove these components. Also in the conventional art, these components are removed before or after a carbonation reaction.

With respect to the lithium carbonate, high purity lithium carbonate is demanded as described above, and it is also as described above that lithium carbonate containing 1 ppm or less of impurities is demanded in some cases.

Methods for producing such high purity lithium carbonate include, for example, a method of subjecting to microfiltration an aqueous solution containing lithium bicarbonate obtained by reacting crude lithium carbonate with carbon dioxide, and thereafter, subjecting the aqueous solution containing lithium bicarbonate to heat treatment to precipitate lithium carbonate (see Patent Document 1), and a method of treating with an ion-exchange module an aqueous solution containing lithium bicarbonate obtained by reacting crude lithium carbonate with carbon dioxide, and thereafter, subjecting the lithium bicarbonate-containing aqueous solution to heat treatment to precipitate lithium carbonate (see Patent Document 2).

Patent Document 1: JP-A-62-252315
Patent Document 2: JP-T-2002-505248
Non-Patent Document 1: GSJ Chishitsu News No. 670, pages 22 to 26, "Lithium Resources"
Non-Patent Document 2: GSJ Chishitsu News No. 670, pages 49 to 52, "Production of Lithium from Salar de Atakama, Chile, and Use of Lithium Compounds"

SUMMARY OF THE INVENTION

As described above, when lithium carbonate is produced in the peripheries of the salt lakes, lithium chloride in the brines as the lithium resource and sodium carbonate as a raw material for the carbonation reaction have been used.

For this reason, in order to produce lithium carbonate, it becomes necessary to use sodium carbonate in an amount corresponding to the amount of lithium chloride used, which is the raw material of lithium.

Because of this, in order to produce it, it becomes necessary to transport sodium carbonate to the high altitudes of the Andes over 3,000 m above sea level, or conversely to transport concentrated brines to places where the raw materials for the reaction such as sodium, carbonate are easily available. In either case, transportation cost thereof has a significant influence on the production cost of lithium carbonate.

Incidentally, in the case where the concentrated brines are transported, the transportation amount increases more than in the case where sodium carbonate is transported, resulting in further increased cost.

Then, in order to solve the above-mentioned problem, the present inventors have made intensive studies on a production process thereof from a viewpoint of reduction in production cost of high purity lithium carbonate. As a result, the invention has been successfully developed.

That is to say, development of a production method for reducing the cost of transportation has been tried by utilizing resources in the fields as much as possible without transporting sodium carbonate to the peripheries of the salt lakes in the Andes and recycling substances produced as by-products in a carbonation process. As a result, it has been found that lithium carbonate can be produced by conducting a carbonation reaction using carbon dioxide and ammonia, different from the conventional methods. Further, in addition to this, it has also been found that the cost of transportation can be reduced, and that the purity can be increased by a simple cleaning operation. Thus, the above-mentioned problem can be solved.

Namely, the present invention relates to the following items 1 to 6.

1. A method for producing lithium carbonate, said method comprising: mixing ammonia and carbon dioxide gas (carbonate gas) with an aqueous solution containing lithium chloride to conduct a carbonation reaction; and thereafter, recovering a produced solid by solid-liquid separation.
2. The method for producing lithium carbonate according to item 1, wherein the aqueous solution containing lithium chloride is prepared by concentrating a brine obtained from a salt lake.
3. The method for producing lithium carbonate according to item 2, wherein a lithium concentration of the brine after the concentration is from 2.0% by weight to saturated concentration.
4. The method for producing lithium carbonate according to any one of items 1 to 3, wherein the carbon dioxide gas is produced by thermal decomposition of limestone in a field where the carbonation reaction is conducted.
5. The method for producing lithium carbonate according to any one of items 1 to 4, wherein the ammonia is produced by reacting ammonium chloride produced as a by-product at the time of producing the lithium carbonate with burnt lime produced as a by-product at the time of producing the carbon dioxide gas or hydrated lime obtained by hydration thereof.
6. A method for producing high purity lithium carbonate, said method comprising cleaning the lithium carbonate recovered in the method according to any one of items 1 to 5 with a highly-concentrated lithium carbonate aqueous solution.

Carbon dioxide used in the carbonation reaction can be produced by burning of limestone which occurs in various places around the world and is a common resource. This also occurs in the Andes, so that carbon dioxide produced by burning thereof is preferably used.

Further, with respect to ammonia, one purchased from manufacturers and transported to the fields is used at the beginning of lithium carbonate production. After that, however, ammonia can be produced by reacting ammonium chloride produced as a by-product at the time of the carbonation reaction with burnt lime produced as a by-product at the time of burning of limestone or hydrated lime obtained by hydration thereof, so that use thereof is preferred.

In the invention, lithium carbonate is produced by reacting ammonia, carbon dioxide and lithium chloride, and lithium carbonate can be recovered by performing solid-liquid separation thereof alone.

Further, the lithium carbonate recovered is cleaned with a highly-concentrated lithium carbonate aqueous solution, thereby being able to recover high purity lithium carbonate. That is to say, high purity lithium carbonate which can be used as a raw material of lithium secondary batteries can be produced, without further highly purifying crude lithium carbonate by using a bicarbonation reaction as described in the above-mentioned Patent Document 1 or 2.

Accordingly, the invention can provide a simple and excellent method for producing lithium carbonate and a method for producing high purity lithium carbonate.

Then, carbon dioxide can be produced by burning limestone which occurs in the fields, so that transportation of the raw materials for the lithium carbonate reaction to the high altitudes can be avoided. Further, ammonia can be produced by decomposing ammonium chloride produced as a by-product at the time of the carbonation reaction by using burnt lime produced as a by-product at the time of burning of limestone or hydrated lime obtained by hydration thereof, and transportation of ammonia to the fields can also be avoided by recycle thereof.

Accordingly, the invention exhibits excellent functions and effects.

DETAILED DESCRIPTION OF THE INVENTION

The method for producing lithium carbonate and the method for producing high purity lithium carbonate according to the invention will be described in more detail below.

As described above, the method for producing lithium carbonate of the invention comprises mixing ammonia and carbon dioxide gas (carbonate gas) with an aqueous solution containing lithium chloride to conduct a carbonation reaction, and thereafter, recovering a produced solid by solid-liquid separation, and the method for producing high purity lithium carbonate comprises cleaning the above-mentioned recovered lithium carbonate with a highly-concentrated lithium carbonate aqueous solution.

In the invention, the aqueous solution containing lithium chloride acting as a raw material for production of lithium carbonate has preferably a lithium concentration from 2.0% by weight to saturated concentration, more preferably from 4.5% by weight to saturated concentration, and still more preferably from 5.5% by weight to saturated concentration. Such an aqueous solution containing lithium chloride in high concentrations can be produced by concentrating a brine of a salt lake containing lithium chloride. As the salt lakes in which such brines occur, there can be exemplified Salar de Atacama (Chile), Salar de Hombre Muerto (Argentine) and Salar de Uyuni (Bolivia) in the Andes.

Further, needless to say, the lithium concentration as used herein means the concentration of lithium element, and does not mean the concentration of lithium chloride in any way.

Incidentally, some reference will be made to the saturated aqueous solution of lithium chloride below.

The solubility of lithium chloride at 0° C. is 67 g/100 g (about 6.3% by weight as the lithium concentration). However, the saturated concentration of lithium is influenced by coexisting ions, so that it is difficult to identify the concentration of the saturated aqueous solution of lithium chloride in the above-mentioned brine by a specific numerical value.

In these brines of the salt lakes in the Andes, lithium is contained in an amount of 0.05 to 0.3%, and these brines are concentrated in the sun, thereby obtaining concentrated brines having a lithium concentration of about 6% by weight. Accordingly, these brines are preferred as brines for producing highly-concentrated aqueous solutions of lithium chloride. In fact, these brines have already been utilized as raw materials for production of high purity sodium carbonate, as described above.

The brine for producing the highly-concentrated aqueous solution of lithium chloride is not limited to any one of the brines of the above-mentioned salt lakes in the Andes, and can be used without any particular limitation as long as it can produce the highly-concentrated aqueous solution of lithium chloride within the above-mentioned range by concentration.

In the brines of these salt lakes, various impurities are contained in addition to lithium chloride, as described above, and sodium, potassium and the like are contained in far higher concentrations than lithium.

These sodium and potassium are partially crystallized in a course of concentration to be precipitated, and the relative concentration thereof to lithium decreases after the concentration.

In the invention, sodium and potassium which have remained after the concentration are separated by the solid-liquid separation at the time of recovering lithium carbonate after the carbonation reaction, and almost completely separated and removed in the subsequent cleaning process. Accordingly, high purity lithium carbonate having a purity of 99% by weight or more can be produced.

Incidentally, in the brines of the above-mentioned salt lakes, magnesium, boron and the like are also contained, in addition to the above-mentioned alkali metals such as sodium. However, it is difficult to completely separate these in the above-mentioned solid-liquid separation process and cleaning process. These can be removed according to a conventional method before the carbonation reaction.

Accordingly, these are preferably separated and removed before the carbonation reaction, but may be separated and removed after the carbonation reaction if possible without being limited thereto.

Separation and removal of these components are described in the above-mentioned Non-Patent Document 2 in detail, so that it is omitted to make further reference thereto in this specification.

When the carbonation reaction is performed, there is no particular limitation on mixing of the lithium chloride-containing aqueous solution, ammonia and carbon dioxide gas (carbonate gas). These may be mixed at the same time. However, it is preferred that ammonia is first added to (introduced into) the lithium chloride-containing aqueous solution, followed by adding carbon dioxide.

Although as described above, ammonia and carbon dioxide gas (carbonate gas) may be concurrently added to the lithium chloride-containing aqueous solution, and in that case, the carbonation reaction is preferably conducted under basic conditions.

Carbon dioxide used in the carbonation reaction can be produced according to the following reaction formula (1) by burning limestone as described above. In that case, a burning furnace is installed in the field, and the burning is preferably performed according to a usual method at 800 to 1,500° C. As the burning furnace, there can be exemplified a Beckenbach furnace, a Merz furnace, a rotary kiln furnace and the like. However, it is selected according to surrounding environment and production scale in the field. Incidentally, in the production of carbon dioxide in the field, it is unnecessary that a carbonation reaction apparatus and the burning furnace are closely disposed so as to be adjacent to each other, and both may be disposed within the range where carbon dioxide generated in the burning furnace can be supplied to the carbonation reaction apparatus through a pipe line without being filled in a container.

$$CaCO_3 \rightarrow CaO + CO_2 \qquad (1)$$

Then, ammonia used in the carbonation reaction may be either ammonia gas or ammonia water in its form. However, at the beginning of the carbonation reaction for producing lithium carbonate, ammonia purchased from a manufacturer and transported to the field is used.

After that, however, ammonium chloride is produced as a byproduct in the carbonation reaction as shown in the following reaction formula (2), and by solid-liquid separation such as filtration, lithium carbonate precipitated can be separated from ammonium chloride dissolved in the liquid. It is therefore preferred that ammonia is recovered by use thereof to perform recycle use.

$$2LiCl + 2NH_4OH + CO_2 \rightarrow Li_2CO_3 + 2NH_4Cl + H_2O \qquad (2)$$

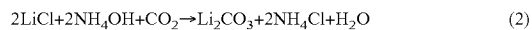

That is to say, burnt lime produced as a by-product at the time of burning limestone or hydrated lime obtained by hydration thereof as shown in the following reaction formula (3) is reacted with ammonium chloride produced as a by-product, thereby being able to produce ammonia as shown in the following reaction formula (4). Recycle use thereof is preferred.

$$CaO + H_2O \rightarrow Ca(OH)_2 \qquad (3)$$

$$2NH_4Cl + Ca(OH)_2 \rightarrow CaCl_2 + 2NH_3 + 2NH_2O \qquad (4)$$

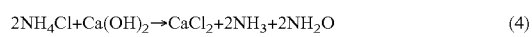

In the invention, by doing like this, lithium carbonate can be produced without procuring carbon dioxide and ammonia as the raw materials for the reaction in the case of producing lithium carbonate from manufacturers in places far removed from the Andes and transporting them to the high altitudes of the Andes over 3,000 in above sea level, after has entered into the normal production process, setting the beginning of the production aside.

As a result, in the invention, production cost can be substantially reduced compared to conventional methods for producing lithium carbonate.

That is to say, in the invention, carbon dioxide as the raw material of the carbonation can be produced using limestone occurring in the fields, and ammonia which becomes necessary as the auxiliary raw material at the time of the carbonation reaction can be produced using ammonium chloride produced as a by-product in the carbonation reaction and burnt lime produced as a by-product at the time of producing carbon dioxide or hydrated lime obtained by hydration thereof. After has entered into the normal production process, lithium carbonate can be produced by recycle use thereof without purchasing the raw materials for the reaction from manufacturers in places far removed from the Andes.

Then, high purity lithium carbonate can be produced by cleaning lithium carbonate thus produced with a highly-concentrated lithium carbonate aqueous solution.

The highly-concentrated lithium carbonate aqueous solution is preferably obtained by dissolving high purity lithium carbonate in water. However, low purity lithium carbonate may be used. Further, the concentration of the highly-concentrated lithium carbonate aqueous solution is preferably from 0.5% to saturated concentration. Incidentally, the solubility of lithium carbonate is 1.54 g/100 g (1.5% by weight as the lithium carbonate concentration) at 0° C.

Further, regarding the water, there is preferably used natural water such as river water clarified. However, the natural water may be used as it is when the purity thereof is not extremely low.

In the invention, as the highly-concentrated lithium carbonate aqueous solution used at the beginning of the production, there is used an aqueous solution obtained by dissolving lithium carbonate produced by a manufacturer in water. After that, however, high purity lithium carbonate can be obtained by cleaning lithium carbonate recovered.

Accordingly, in the normal production stage, the highly-concentrated lithium carbonate aqueous solution can be produced by dissolving purified lithium carbonate recovered in natural water and the like occurring in the field, so that use thereof is preferred.

That is to say, high purity lithium carbonate can be produced by using the highly-concentrated lithium carbonate aqueous solution thus produced without using lithium carbonate produced by a manufacturer, so that the invention can reduce production cost also in this point.

EXAMPLES

The invention will be described with reference to an example below, but it goes without saying that the invention should not be construed as being limited by the example in any way, and should be identified by the description of the claims.

Incidentally, in Example, a simulated brine in which potassium chloride and sodium chloride were allowed to be contained in lithium chloride was prepared, and lithium carbonate and high purity lithium carbonate were produced using the same.

The simulated brine was prepared using lithium chloride, potassium chloride and sodium chloride, all of which were first class grade chemicals, so as to contain 0.1% by weight of lithium (Li), 1.5% by weight of potassium (K) and 8.1% by weight of sodium (Na).

This simulated brine was concentrated by evaporation and filtered after the concentration, thereby separating a precipitated solid to obtain a concentrated brine containing 6.0% by weight of Li.

Incidentally, at the time of the above-mentioned concentration, potassium chloride and sodium chloride were partially precipitated and solid-liquid separated by the above-mentioned filtration, so that the relative concentrations thereof to Li in the concentrated brine decreased. However, measurement of the concentrations thereof was omitted.

In 250 mL of the resulting concentrated brine, ammonia gas was dissolved in such an amount that the Li:$NH_3$ molar ratio became 1:1. Thereafter, carbon dioxide obtained by burning limestone in a tubular furnace was introduced therein at a rate of 1.0 L/min for 75 minutes.

After completion of this introduction operation, the resulting precipitate was recovered by filtration under reduced pressure, and analyzed with an X-ray diffractometer. As a results the precipitate could be identified to be lithium carbonate.

Then, 250 mL of a saturated aqueous solution prepared by dissolving lithium carbonate (first class grade chemical) in water was allowed to pass through this lithium carbonate recovered to clean it, and the lithium content of lithium carbonate after the cleaning was measured using an inductively coupled plasma optical emission spectrometer. For the measurement results thereof, the purity of lithium carbonate was calculated on the assumption that lithium was all contained as lithium carbonate. As a result, the purity was 99.5% by weight. The recovery rate of lithium from the simulated brine in this case was 78%.

Incidentally, 200 mL of a reaction filtrate from which lithium carbonate had been recovered was placed in a conical flask, and a stirring bar and 60 g of hydrated lime prepared by hydrating the above-mentioned burnt lime were added therein, followed by heating at 60° C. while stirring with a hot stirrer and observation.

As a result, a gas was generated. The gas generated was introduced into ion-exchange water to which a phenolphthalein indicator had been added. As a result, a red color was immediately shown. Further, after the gas generation had been under control, the ion-exchange water recovered was analyzed by ion chromatography. As a result, the gas could be confirmed to be ammonia.

What is claimed is:

1. A method for producing lithium carbonate, said method comprising:
   (i) thermally decomposing limestone to produce carbon dioxide (carbonate gas);
   (ii) adding ammonia to an aqueous solution containing lithium chloride;
   (iii) adding carbon dioxide to the resulting ammoniated aqueous solution containing lithium chloride of step (ii) to conduct a carbonation reaction to produce lithium carbonate; and
   (iv) thereafter, recovering the produced lithium carbonate by solid-liquid separation,
   wherein ammonia generated by reacting (a) ammonium chloride produced in step (iii) as a by-product with (b) burnt lime produced in step (i) as a by-product or hydrated product thereof is recycled as ammonia used in step (ii); and
   wherein the thermal decomposition of limestone is conducted in a field where the carbonation reaction is conducted.

2. The method for producing lithium carbonate according to claim 1, wherein the aqueous solution containing lithium chloride is prepared by concentrating a brine obtained from a salt lake.

3. The method for producing lithium carbonate according to claim 2, wherein a lithium concentration of the brine after the concentration is from 2.0% by weight to saturated concentration.

4. A method for producing high purity lithium carbonate, said method comprising cleaning the lithium carbonate recovered in the method according to claim 1 with a highly-concentrated lithium carbonate aqueous solution.

* * * * *